United States Patent [19]

Bihler et al.

[11] Patent Number: 5,203,486
[45] Date of Patent: Apr. 20, 1993

[54] CRANK DRIVE FOR A MATERIAL FEEDER

[75] Inventors: Otto Bihler, Halblech/Füssen, Fed. Rep. of Germany; Eduard Brüller, Trimbach, Switzerland

[73] Assignee: Otto Bihler Maschinenfabrik GmbH & Co. KG, Halblech/Fussen, Fed. Rep. of Germany

[21] Appl. No.: 545,917

[22] Filed: Jun. 28, 1990

[30] Foreign Application Priority Data

Jul. 4, 1989 [DE] Fed. Rep. of Germany ....... 3921998

[51] Int. Cl.⁵ .......................................... B65H 20/00
[52] U.S. Cl. ..................................... 226/142; 226/136; 226/139; 226/158
[58] Field of Search ............... 226/138, 137, 139, 141, 226/142, 158, 120, 135, 136; 74/23, 24, 25, 39, 40, 53

[56] References Cited

U.S. PATENT DOCUMENTS

| | | | |
|---|---|---|---|
| 3,242,768 | 3/1966 | Munschauer, Jr. | 74/53 X |
| 3,263,512 | 8/1966 | Handley | 74/53 X |
| 3,585,837 | 6/1971 | Bihler | 74/53 X |
| 3,863,823 | 2/1975 | Allred | 226/142 |

FOREIGN PATENT DOCUMENTS

| | | |
|---|---|---|
| 663937 | 7/1938 | Fed. Rep. of Germany . |
| 2706351 | 8/1978 | Fed. Rep. of Germany . |
| 2740211 | 3/1979 | Fed. Rep. of Germany . |
| 2741149 | 3/1979 | Fed. Rep. of Germany . |
| 2928646 | 3/1980 | Fed. Rep. of Germany . |
| 2850944 | 5/1980 | Fed. Rep. of Germany . |
| 2613269 | 3/1981 | Fed. Rep. of Germany . |
| 2856560 | 7/1986 | Fed. Rep. of Germany . |

Primary Examiner—Joseph J. Hail, III
Assistant Examiner—Paul Bowen
Attorney, Agent, or Firm—Brumbaugh, Graves, Donohue & Raymond

[57] ABSTRACT

A crank drive for the material feeder of a machine tool is constructed so that the position of the crank pin along a line of action thereof, viewed in a position/time curve of the crank pin, is a modified sine curve, which curve is modified in that the peaks of the sine curve are flattened. To achieve this, the crank pin is adjustable relative to a crank disc on the one hand by a basic eccentricity setting device and on the other hand by an eccentricity correcting device. The eccentricity correcting device comprises cams mounted stationarily on the bearing arrangement of the crank disc and a cam follower engaging the cams. The cam follower acts on a main slide movably guided on the crank disc. The basic eccentricity setting device is effective between the main slide and a secondary slide carrying the crank pin. The secondary slide is guided on the main slide.

14 Claims, 7 Drawing Sheets

CRANK DRIVE FOR A MATERIAL FEEDER

BACKGROUND OF THE INVENTION

The invention relates to a crank drive for a material feeder on a machine tool, in particular an automatic punching and bending tool, comprising a crank disc revolving at constant speed round a crank disc axis in a stationary bearing arrangement and a crank pin which is mounted by means of a slide arrangement on the crank disc and of which the eccentricity is adjustable relative to the crank disc axis, wherein, for adjustment of the eccentricity of the crank pin, on the one hand a basic eccentricity setting device actuated by external action is provided and, on the other hand, an eccentricity correcting device which is dependent on the rotational angle, i.e. dependent on the respective local angular setting of the crank disc, is provided.

STATEMENT OF THE PRIOR ART

Such a crank drive is known from DE-OS 27 06 351. Particular reference is made to the embodiment according to FIG. 7 thereof. In this embodiment, a main slide is adjustably mounted on the crank disc by means of a spindle drive. The crank pin is mounted on a subsidiary slide aligned with the main slide. A hydraulic eccentricity correcting device is mounted between the main slide and the subsidiary slide. This eccentricity correcting device comprises a piston loaded on both sides in a cylinder rigidly mounted on the main slide. For correcting eccentricity during the rotation of the crank pin about the crank disc axis, it is necessary to displace the piston, corresponding to the desired correction, by corresponding hydraulic supplies and discharges of the cylinder chambers located on both its sides. This supply and discharge has to take place periodically in time with the rotation of the crank disc. For this purpose, rotary connections between the cylinder chambers and a stationarily arranged supply mechanism are required for each of the two cylinder chambers in addition to a metering device operating with high precision.

With this known arrangement, it is possible to correct the position/time characteristic of the linear motion of the crank pin in the direction of a line of action radial to the crank disc axis relative to a sine curve such that the peaks of opposing crests are flattened and the angle of inclination of the central regions of the slopes are made steeper relative to the time line. This is desirable in order to reduce, on the one hand, the feed time of the material feeder and, on the other hand, the compression path of a resilient member located in the transmission path between crank pin and material feeder as the material feeder strikes the end limit stops.

A mechanical solution for obtaining such a modified position/time characteristic of the linear motion of the crank pin along its line of action is also known from DE-PS 28 50 944. In that arrangement, a slide block is rotatably mounted on the crank pin of which the basic eccentricity can be set relative to the crank disc axis. This slide block engages in a slideway of a connecting rod leading from the crank pin to the material feeder. A trifurcate constant diameter cam is also arranged on the crank disc rigidly in terms of operation relative thereto. Two cam follower rollers which continuously engage with the peripheral curve of the constant diameter cam are mounted on the connecting rod. In this embodiment, it is necessary, if the basic eccentricity is altered, to adjust the constant diameter cam on the cam disc in each case in its angular position about the crank pin and to fix it again and at the same time to set the direction of displacement of the cam follower formed by the cam follower rollers to various directions relative to the direction of movement of the feed slide. This entails considerable setting expenditure each time the basic eccentricity is altered.

OBJECT OF THE INVENTION

On the basis of the crank mechanism defined at the outset, the object of the invention is to provide a mechanical mechanism for obtaining desired position/time curves, in which the setting expenditure required when altering the basic eccentricity is reduced.

SUMMARY OF THE INVENTION

To achieve this object it is proposed according to the invention that a main slide guided on the crank disc substantially radially to the crank disc axis in a main slide guide is movable from a cam profile arrangement which is stationary relative to the bearing arrangement by means of a cam follower arrangement and in that the crank pin is adjustable relative to the main slide by the basic eccentricity setting device arranged on the main slide.

It has been found that with the design of the crank drive according to the invention, further conversion measures are basically not required besides adjustment of the basic eccentricity, providing that the basic eccentricity remains within a given basic eccentricity range. If very great alterations of basic eccentricity are intended, it may be necessary to exchange the cam profile arrangement for various consecutive basic eccentricity ranges.

To simplify the process of altering the basic eccentricity, it is proposed that a secondary slide carrying the crank pin is arranged on the main slide and is adapted to be set by the basic eccentricity setting device. The basic eccentricity setting device can be formed, for example, by a spindle mechanism and the secondary slide can be guided on the main slide in a secondary slide guide which is substantially parallel to the main slide guide.

The cam profile arrangement can be constructed as a cam profile arrangement which is closed in the form of a ring round the axis of rotation. The engagement between the cam follower arrangement and the cam profile arrangement may be maintained by a biasing spring system acting on the cam follower arrangement. If maximum precision is required, which can be impaired by loss of engagement between cam follower arrangement and cam profile, positive solutions which are independent of biasing springs are provided. In one such solution, the cam profile arrangement comprises two cam profiles which extend with substantially constant spacing, of which one is directed radially inwards and another radially outwards, and the cam follower arrangement comprises two adjacent cam follower rollers of which one engages with one cam profile and the other with the other cam profile. In a further solution, the cam profile arrangement has two cam profiles which are mutually offset in the direction of the cam disc axis and are similarly directed radially inwards or radially outwards, and the cam follower arrangement has respective cam follower rollers engaging with each of the cam profiles.

The curve or the curves of the cam profile arrangement can be shaped in various ways in order to obtain the optimum modification of the sine curve in each case. For example, the cam profile arrangement can be shaped such that the crank pin along its line of action follows a position curve —plotted over a time line— which is derived from a sine curve and is flattened in the region of its opposingly directed peaks.

Owing to such shaping, only the deformation path of the resilient element interposed between crank pin and material feed slide is shortened without the feed time being substantially shortened and without significantly extending the machining time for the machining tools of the machinery.

However, it is also possible to shape the double cam arrangement such that the cam profile arrangement is shaped such that the crank pin follows a position curve—plotted over a time line—is derived from a sine curve and is made steeper than a sine curve in the region of the central regions of its slopes, i.e. encloses with the time line an angle increased toward 90°.

With such a construction, a reduction in the feed time and consequently an extension of the machining time can optionally be achieved in addition to the reduction in the compression path of the resilient transmission element.

The adaptability of the correction of eccentricity to different basic eccentricity values within a given range of basic eccentricity by means of a single cam profile arrangement can also be further improved in that a transmission gear with variable transmission ratio is interposed between the cam follower and the main slide. Such an alteration of the transmission ratio necessitates an additional setting measure in case of an alteration of basic eccentricity, but this alteration measure is unevenly slighter, in terms of setting costs, than the conversion measures necessary with the solution pertaining to the prior art.

According to a preferred embodiment, the additional conversion measure as a separate operation can be spared by making the transmission ratio of the transmission gear variable as a function of the setting of the basic eccentricity setting.

A possible method of influencing the transmission ratio resides in the fact that a cam follower carrier is guided substantially radially to the crank disc axis in a carrier guide on the crank disc, in that an oblique guide offset at an angle from the carrier guide is arranged on the cam follower carrier and in that an opposing oblique guide which engages in the oblique guide and is offset at an angle to the direction of the main slide guide is mounted on the main slide. The transmission ratio depends on the measure of the respective angular offset of the oblique guide or of the opposing oblique guide.

In such an embodiment, the transmission ratio can easily be made variable in that the oblique guide of the cam follower carrier is mounted in a setting element which is rotatably mounted relative to the cam follower carrier about a setting axis parallel to the crank disc axis and in that the opposing oblique guide of the main slide is mounted in an opposing setting element which can be set on the main slide about a setting axis parallel to the crank disc axis, and in that at least one of the two elements: setting element, opposing setting element can be fixed on the respective associated part: cam follower carrier, main slide at different angular settings about the respective setting axis. Owing to the fact that measures for altering the transmission are easier to implement, it is recommended that the opposing setting element be fixable on the main slide at various angular settings about the respective setting axis.

The idea of making the eccentricity correction of the crank pin a function of the basic eccentricity setting can be adopted in the embodiment with the setting element having an oblique guide and the opposing setting element having an opposing oblique guide in such a way that the opposing setting element can be adjusted as an inevitable function of the setting of the basic eccentricity setting device mounted on the main slide. This function can be obtained, for example, when the crank pin is arranged on a secondary slide guided in a secondary slide guide of the main slide in that the secondary slide is provided with a rack and in that this rack meshes with a gear-wheel mounted on the opposing setting element.

The co-operation of oblique guide and opposing oblique guide can be guaranteed, for example, in that, of the oblique guide and the opposing oblique guide, one is constructed as a guide groove and the other as a guide rib engaging in this guide groove.

The drive transmission means from the crank pin onto a feed slide of a material feeder are optional and are not restricted by the configuration of the crank mechanism according to the invention. Thus it is possible, for example, for the crank pin to be connected via a connecting rod mechanism to a feed slide or for the crank pin to be connected via a crank slot mechanism to a feed slide.

The term crank disc should cover any form of rotary part with crank pin. Thus it is possible for the crank disc to be formed by a part of a drive shaft or by a flange placed on the drive shaft.

To allow greater changes of basic eccentricity, it is advisable to mount the cam profile arrangement detachably on the bearing arrangement.

SHORT DESCRIPTION OF THE DRAWINGS

The accompanying drawings illustrate the invention.

DETAILED DESCRIPTION OF THE PREFERRED EMBODIMENTS

Figure 1:
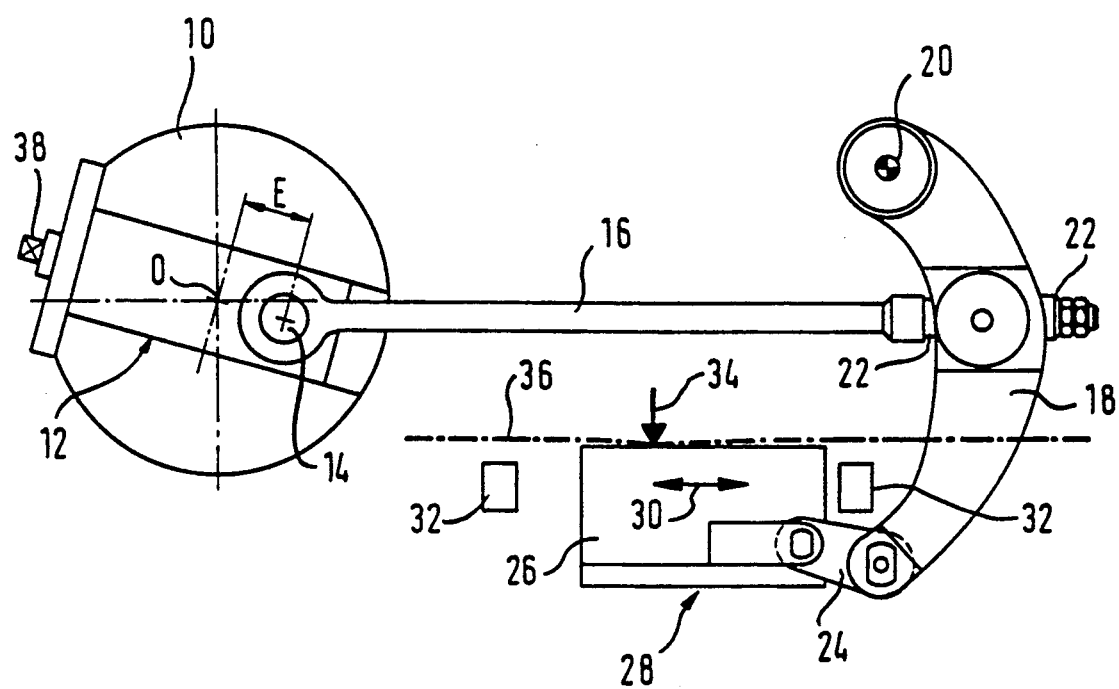
FIG. 1 shows a diagram of a material feeder with crank mechanism.
Figure 6:
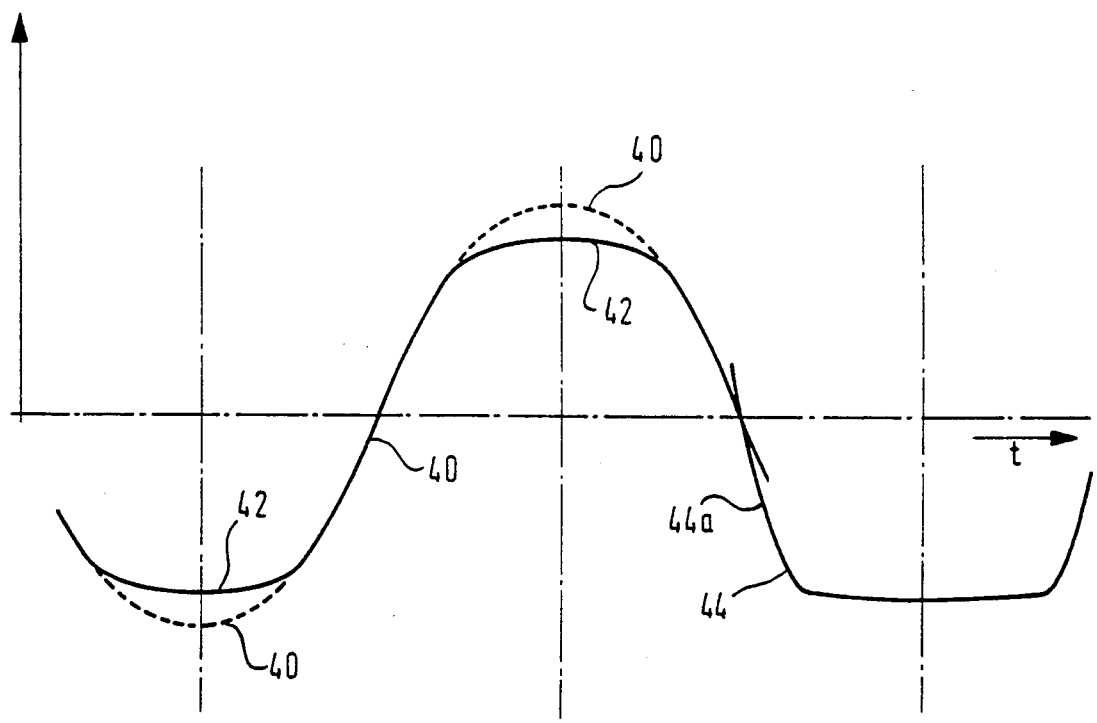
FIG. 6 shows the position/time characteristic, attainable with a crank mechanism according to FIGS. 2 to 5, of the feed slide according to FIG. 1.

FIG. 1 shows a crank disc 10 rotating about an axis 0 with a slide arrangement 12. A crank pin 14 which is eccentric to the crank disc axis 0 is mounted on the slide arrangement 12. A connecting rod 16 leads from the crank pin 14 to a transmission lever 18 which is pivotal about a stationary pivot axis 20. The transmission lever 18 is connected to the connecting rod 16 by means of transmission elements 22 which are resiliently compressible. At its free end, the transmission lever 18 is connected via an articulated shaft 24 to a feed slide 26 of a feeder 28. The feed slide 26 is reciprocated in the direction of the arrow 30 by the pivoting lever 18 when the crank disc 10 revolves. In this process, the feed slide 26, close to the end points of its oscillatory motion in each case, strikes abutments 32, the respective remaining motion of the pivoting lever 18 then being absorbed by the transmission elements 22 which are resiliently compressible. On the feed slide 26 there is mounted a material clamping device 34 which is controlled at the machine rhythm so that it grips the material 36 to be fed when the feed slide 26 has reached the left-hand stop 32 and releases it in each case when the feed slide 26 has reached the right-hand stop 32. In this way the material 36, namely a wire or strip, is advanced stepwise from left to right. A material holding device which secures the material in each case when the clamping device 34 is released and is consequently controlled alternately to the material clamping device 34, is not shown. The slide arrangement 12 is made up such that the basic eccentricity E can be altered by a spindle mechanism 38 and such that the eccentricity is also corrected during a single revolution of the crank pin 14 about the crank disc axis 0. The result of eccentricity correction is shown in FIG. 6. If eccentricity correction did not occur, the feed slide 26 would move according to the sine curve 40. Flattened crests 42 are formed owing to the correction of eccentricity. A further curve shape 44 attainable by eccentricity correction is also shown on the right-hand side of FIG. 6, in which the slopes 44a are steeper in the region of the time axis t, i.e. the feed time is reduced and the material machining time by the machining tools (not shown) is therefore extended.

Reference will now be made to FIGS. 2 to 5 which again show the crank disc 10 and the slide arrangement 12.

Figure 4:
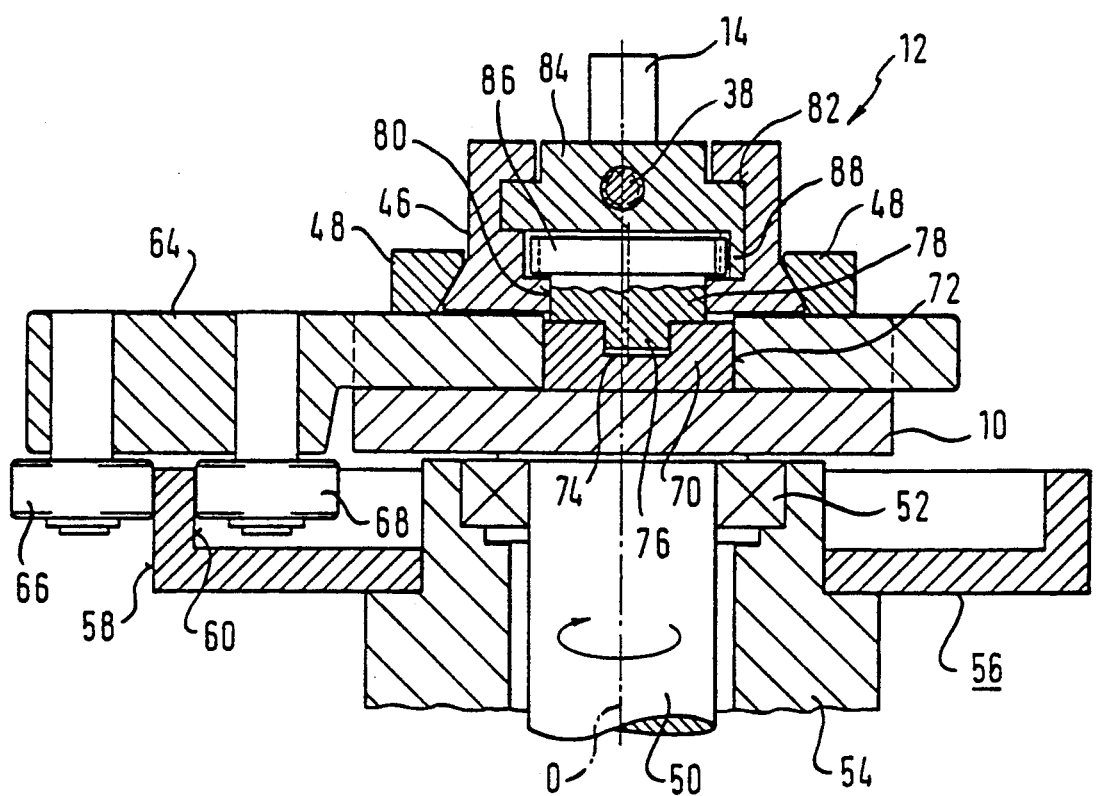
FIG. 4 shows a section along the line IV in FIG. 2.
Figure 5:
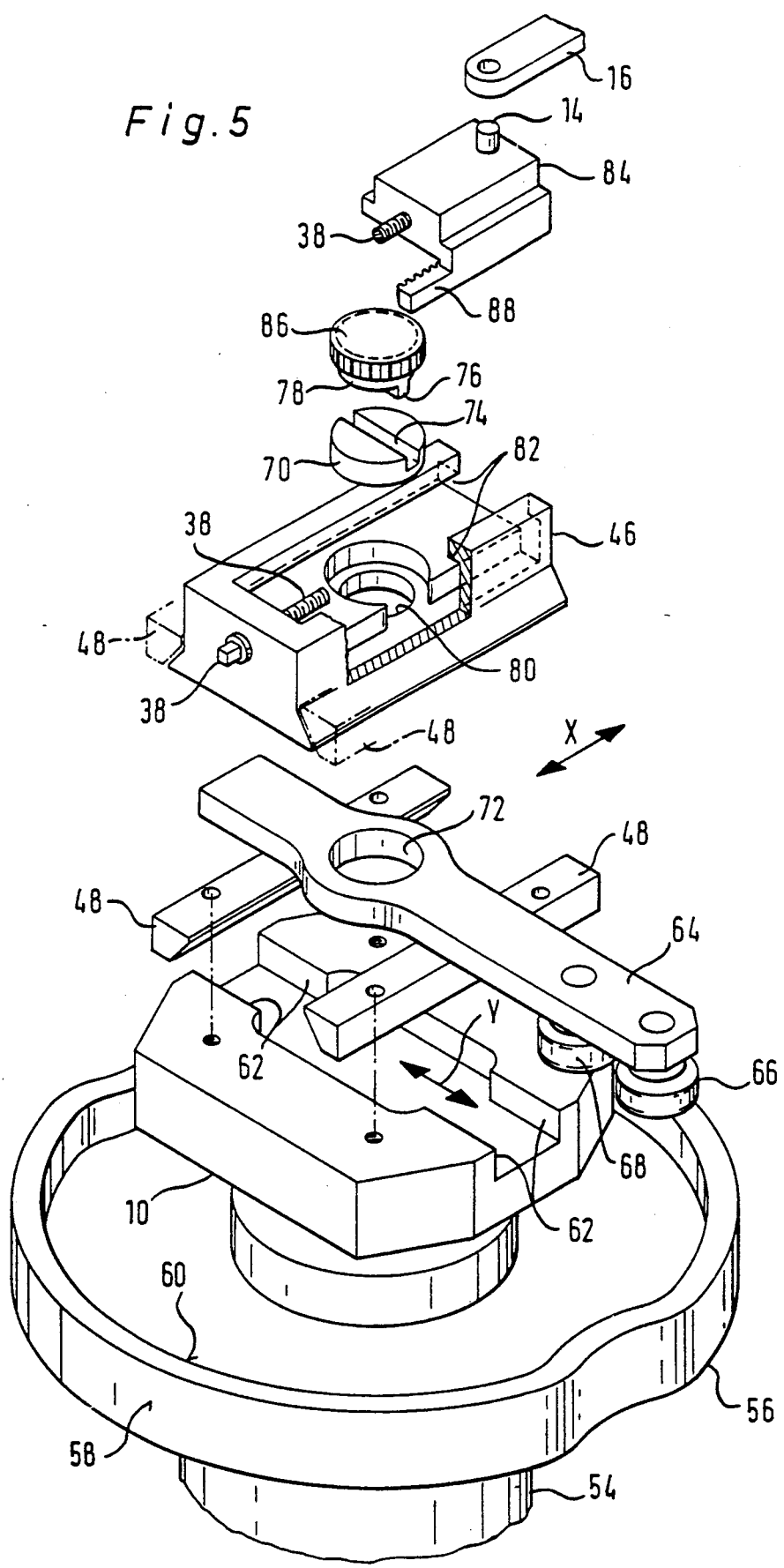
FIG. 5 shows an exploded view of the embodiment according to FIGS. 2 to 4.

The slide arrangement 12 comprises a main slide 46 which, as shown in particular in FIGS. 4 and 5, is guided in a main slide guide 48 on the crank disc 10. The crank disc 10 is rigidly connected to a drive shaft 50 which is rotatably mounted by means of a bearing 52 is a bearing housing 54 and is driven at a constant speed.

Figure 2:
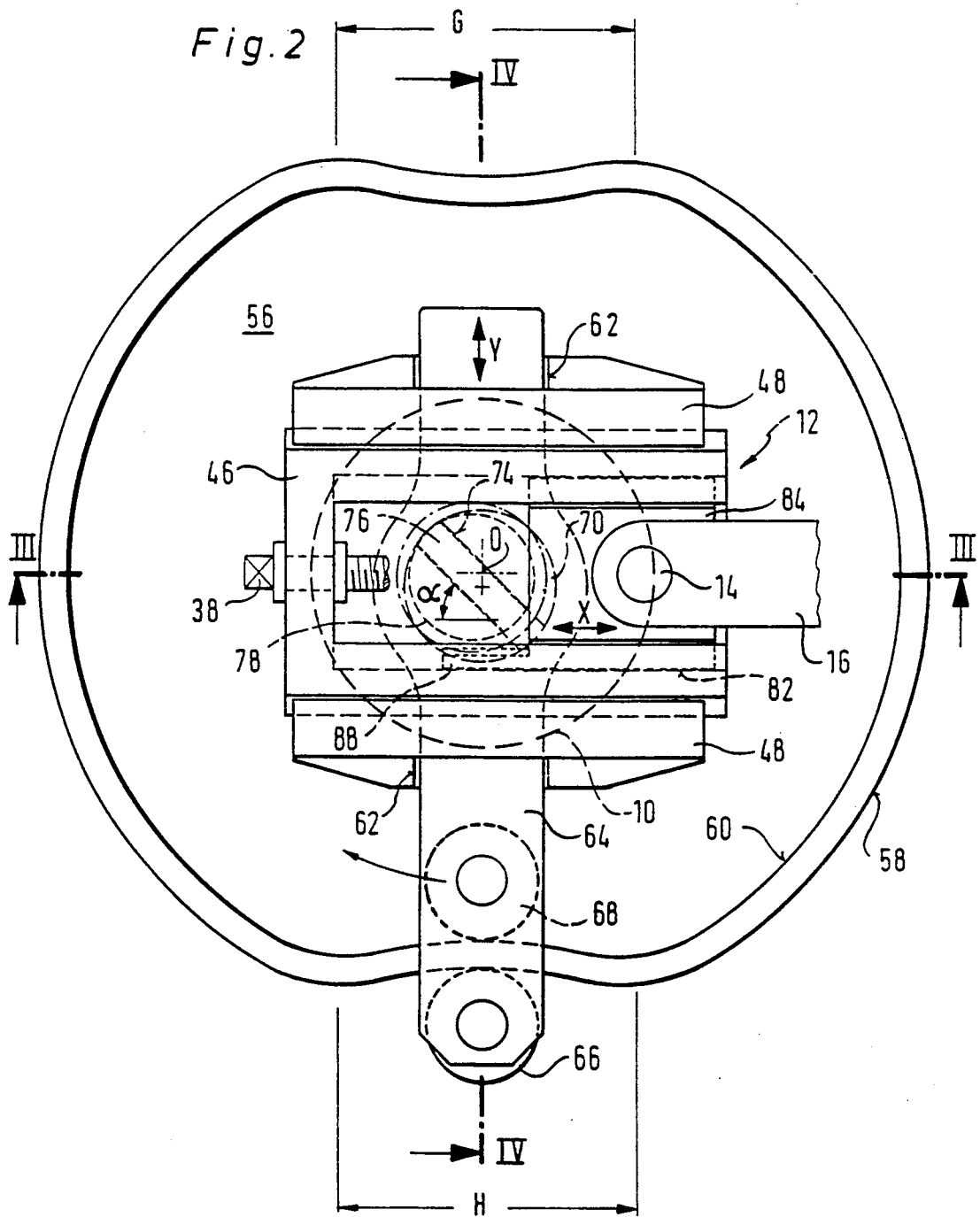
FIG. 2 shows a plan view of a crank mechanism according to the invention.
Figure 3:
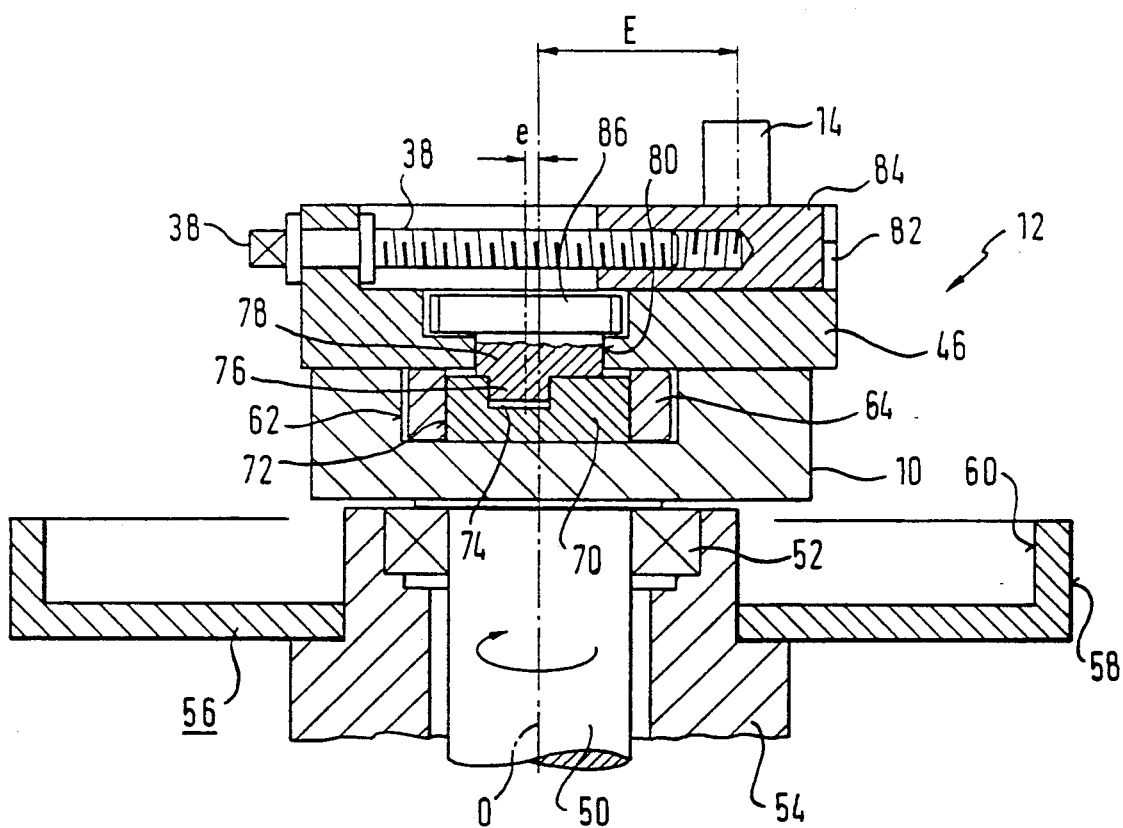
FIG. 3 shows a section along the line III in FIG. 2.

The movement of the main slide 46 along the main slide guide 48 is derived from a pot-shaped cam disc 56 which is fixed rigidly but detachably on the bearing housing 54 and extends right round the crank disc axis 0. Two cam profiles 58 and 60 are mounted on the pot-shaped cam disc 56, the cam profile 58 facing radially outward and the cam profile 60 radially inward. A cam follower carrier 64 is movably guided substantially radially to the crank disc axis 0 in a carrier guide 62 of the crank disc 10. At the left-hand end region of FIG. 4, the cam follower carrier 64 has two cam follower rollers 66, 68, one 66 of which engages with the cam profile 58 and the other 68 engages with the cam profile 60. As shown in FIG. 2, the cam profiles 58 and 60 have a course deviating from the circular shape. When the crank disc 10 revolves, the cam follower carrier 64 is periodically reciprocated along the carrier guide 62 owing to the engagement of the cam follower rollers 66, 68 in the cam profiles 58, 60. This reciprocating motion of the cam disc carrier is transmitted to a setting element 70 which is rotatably held in a cylindrical recess 72 of the cam follower carrier 64. This setting element 70 has an oblique guide groove 74 which—as shown in particular in FIG. 2—is inclined by an angle α of about 45° to the guide direction of the cam follower carrier 64. The oblique guide groove 74 engages with an oblique guide rib 76 mounted on an opposing setting element 78. The opposing setting element 78 is rotatably held in a cylindrical recess 80 in the main slide 46 and is secured non-rotatably in the main slide 46.

When the cam follower carrier 64 performs a reciprocating motion along its guide 62, this reciprocating motion is transmitted via the oblique guide groove 74 and the oblique guide rib 76 of the setting element 70 and opposing setting element 78 to the main slide 46. The guide direction X of the main slide 46 determined by the guide rails 48 runs approximately perpendicularly to the guide direction Y of the cam follower carrier 64 determined by the carrier guide 62. When the oblique guide groove 74 and the oblique guide rib 76 are set at 45° to the guide directions X and Y, the transmission ratio is 1:1, i.e. the movement of the cam follower carrier 64 is converted into an equally great movement of the main slide 46. The transmission ratio can be altered by altering the inclination of the angle α in FIG. 2.

A secondary slide 84 is guided in a secondary slide guide 82 on the main slide 46; the guide direction of the secondary slide guide 82 is parallel to the guide direction X of the main slide 46. The secondary slide 84 carries the crank pin 14 and is adjustable relative to the main slide 46 by the spindle mechanism 38 with setting of the basic eccentricity E. The correction of eccentricity resulting during a revolution of the crank pin 14 about the crank disc axis 0 is designated by e in FIG. 3. The value e varies during a revolution of the crank disc 10 according to the course of the cam profiles 58 and 60. Therefore, the position/time curve 40, 42 according to FIG. 6 materialises, and this curve 40, 42 shows the position of the crank pin 14 in the direction of the arrow X as a function of time or of angle of rotation and corresponds approximately to the path of movement of the feed slide 26.

As shown in FIGS. 4 and 5, a gear-wheel 86 which engages with a rack 88 on the secondary slide 84 is connected non-rotatably to the opposing setting element 78. If the secondary slide 84 is shifted by the spindle mechanism 38 in the secondary slide guide 82, the gear-wheel 86 necessarily rotates and the angle α according to FIG. 2 therefore alters, in other words: the transmission ratio between the movement of the cam follower carrier 64 in the guide direction Y and the movement of the main slide 46 in the direction of movement X is altered.

The spindle mechanism 38 is self-locking so that after an actuation of the spindle mechanism 38, the secondary slide 84 remains stationary on the main slide 46 and the angle α is rigidly set.

This instantaneous eccentricity of the crank pin 14 follows from the superimposition of the basic eccentricity E set by the spindle mechanism 38 and the eccentricity correction e induced by the course of the cam profiles 58, 60.

In the example, the curves 58 and 60 have a respective flattened region or indentation in the regions G and H, which are responsible for the flattened regions 42 in FIG. 6 relative to the sine crests indicated in broken lines.

The basic eccentricity E and the angle α and therefore the transmission ratio between the cam follower carrier 64 and the main slide 46 can be altered simultaneously by rotating the spindle mechanism 38. In this way, the eccentricity correction e can be adapted in each case to the basic eccentricity E, each time within a given basic eccentricity range. If this basic eccentricity range is exceeded, the pot-shaped cam disc 56 can be exchanged for a cam disc which corresponds to the following basic eccentricity region E.

Figure 7:
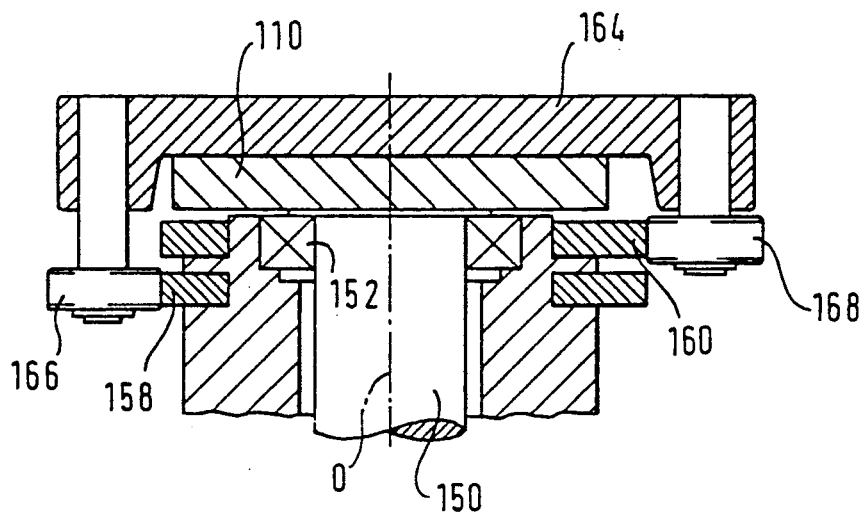
FIG. 7 shows a variation of the cam profile arrangement and of the cam follower arrangement.

FIG. 7 shows a variation of the embodiment according to FIGS. 2 to 6. Similar parts are provided with identical reference numerals to FIGS. 2 to 6, increased by the number 100 in each case.

The embodiment according to FIG. 7 differs from those according to FIGS. 2 to 6 only in that two cam discs 158 and 160 are provided instead of the pot-shaped cam disc 56. The cam follower rollers 166, 168 are diametrally opposed about the crank disc axis 0; one of them rests on the cam disc 158 and the other on the cam disc 160.

Figure 8:
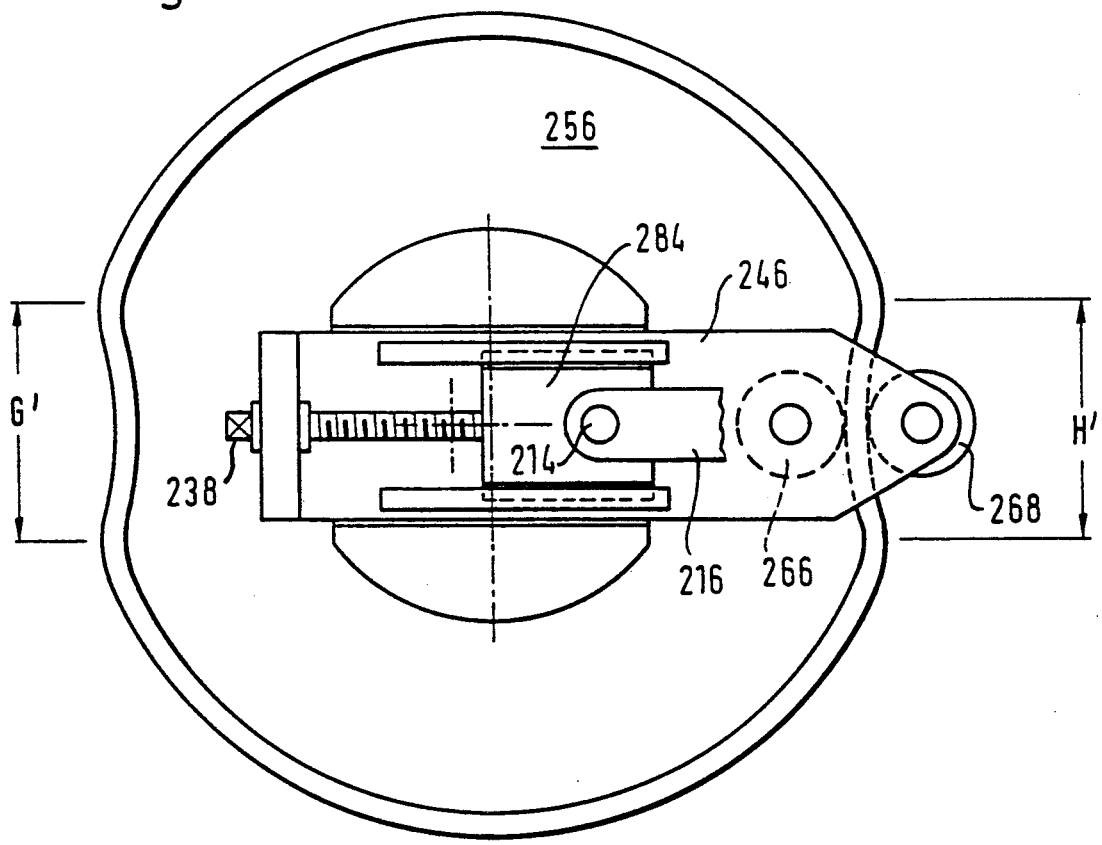
FIG. 8 shows a simplified embodiment in which the variable transmission ratio is omitted.

FIG. 8 shows a simplified embodiment. Similar parts are again provided with identical reference numerals as in the embodiment according to FIGS. 2 to 6, this time increased by the number 200. In this embodiment, the main slide 246 itself is a cam follower carrier and carries the cam follower rollers 266, 268 engaging with the pot-shaped cam disc 256. The secondary slide 284 can be adjusted relative to the main slide 246 by the spindle mechanism 238. In this embodiment, the indentations G' and H' are offset by 90° from the position of the indentations G and H in the embodiment according to FIGS. 2 to 6. The result corresponds to the result shown in FIG. 6. It is obviously not possible to alter the transmission ratio here. Therefore, this embodiment is applicable only to narrower basic eccentricity ranges. It is also possible to exchange the cam disc 256 in this case.

We claim:

1. A crank drive mechanism for a material feeding device (26,34) on a material processing machine, said crank drive mechanism comprising a crank rotor (50,10) revolving at a substantially constant speed around a crank rotor axis (10), said crank rotor (50,10) being rotatably mounted in a stationary bearing arrangement (52,54), a main slide element (46) being guided on said crank rotor (50,10) in a direction (X) substantially radial to said crank rotor axis (0) and defined by main slide element guide means (48), a secondary slide element (84) being guided on said main slide element (46) by secondary slide element guide means (82) substantially parallel to said main slide element guide means (48), said secondary slide element (84) carrying a crank pin (14) for common movement therewith, cam track means (58,60) being arranged in a stationary position with respect to said stationary bearing arrangement (52,54) around said crank rotor axis (0), a cam follower carrier unit (64) being guided on said crank rotor (50,10) in a direction (Y) substantially radial with respect to said crank rotor axis (0) and defined by carrier unit guide means (62), said direction (Y) defined by said carrier unit guide means (62) being oblique with respect to said direction (X) defined by said main slide element guide means (48), said cam follower carrier unit (64) being provided with cam follower means (66,68) engaging said cam track means (58,60), a linear motion transmission unit (76,74) being provided between said cam follower carrier unit (64) and said main slide element (46), said cam follower carrier unit (64) being subjected to a to and fro linear motion along said direction (Y) defined by said carrier unit guide means (62) in response to said cam follower means (66,68) following said cam track means (58,60) in circumferential direction, said main slide element (46) being subject to a to and fro linear motion along said direction (X) defined by said main slide element guide means (48), said to and fro linear motion of said main slide element (46) being derived from said to and fro linear motion of said cam follower carrier unit (64) through said linear motion transmission unit (76,74) having a variable transmission ratio, the transmission ratio of said linear motion transmission unit (76,74) being variable by transmission ratio setting means (88,86), said secondary slide element (84) with said crank pin (14) being settable with respect to said main slide element (46) along said secondary slide element guide means (82) by a basic eccentricity setting device (38).

2. A crank drive mechanism as set forth in claim 1, said basic eccentricity setting device (38) being formed by a spindle mechanism (38).

3. A crank drive mechanism as set forth in claim 1, said cam track means (58,60) being provided in annular arrangement around said crank rotor axis (0).

4. A crank drive mechanism as set forth in claim 3, said cam track means (58,60) comprising two cam tracks (58,60) which extend with substantially constant spacing around said crank rotor axis (0), with one (60) of said cam tracks (58,60) being directed radially inwards and the other (58) of said cam tracks (58,60) being directed radially outwards, said cam follower means (66,68) comprising two adjacent cam follower rollers (66,68), one (68) of said cam follower rollers (66,68) engaging said one cam track (60), and the other (66) of said cam follower rollers (66,68) engaging said other cam track (58).

5. A crank drive mechanism as set forth in claim 1, said cam track means (158,160) comprising two cam tracks (158,160) which are mutually off-set in the direction of the crank rotor axis (0) and are both directed in the same radial inwards direction and radial outwards direction, said cam follower means (166,168) comprising respective cam follower rollers (166,168) engaging with respective ones of said cam tracks (158,160).

6. A crank drive mechanism as set forth in claim 1, said transmission ratio setting means (88,86) comprising a rack (88) connected to said secondary slide element (84) for common movement therewith, said rack (88) meshing with a gear wheel (86) operatively connected with said linear motion transmission unit (76,74).

7. A crank drive mechanism as set forth in claim 1, said crank pint (14) being connected to said material feeding device (26,34) by connecting rod means (16).

8. A crank drive mechanism for a material feeding device (26,34) on a material processing machine, said crank drive mechanism comprising a crank rotor (50,10) revolving at a substantially constant speed around a crank rotor axis (0), said crank rotor (50,10) being rotatably mounted in a stationary bearing arrangement (52,54), said crank rotor (50,10) being provided with a crank pin (14), said crank pin (14) being connected through connecting rod means (16) to a linearly guided feed slide element (26) for imparting a periodical back and forth movement to said feed slide element (26), a movement correction device (10,64, 76,74,46) being provided in series with said connecting rod means (16) between said crank rotor (50,10) and said feed slide element (26), said movement correction device (10,64,76,74,46) comprising a guide means carrier block (10), a cam follower carrier unit (64) being guided on said guide means carrier block (10) in a direction (Y) lying within a plane substantially orthogonal to said crank rotor axis (0) and being defined by carrier unit guide means (62), a main slide element (46) being guided on said guide means carrier block (10) in a direction (X) lying within a plane substantially orthogonal with respect to said crank rotor axis (0) and defined by main slide element guide means (48), said direction (Y) defined by said carrier unit guide means (62) being oblique with respect to said direction (X) defined by said main slide element means (48), said cam follower carrier unit (64) being provided with cam follower means (66,68), said cam follower means (66,68) being engaged with cam track means (58,60), a linear motion transmission unit (74,76) being provided between said cam follower carrier unit (64) and said main slide element (46), said cam follower carrier unit (64) being subject to a to and fro linear motion along said direction (Y) defined by said carrier unit guide means (62) in response to said cam follower means (66,68) following said cam track means (58,60) in a circumferential direction therearound, said main slide element (46) being subjected to a to and fro linear motion along said direction (X) defined by said main slide element guide means (48), said to and fro linear motion of said main slide element (46) being derived from said to and fro linear motion of said cam follower carrier unit (64) through said linear motion transmission unit (76,74), the transmission ratio of said linear motion transmission unit (76,74) being variable by transmission ratio setting means (88,86).

9. A crank drive mechanism as set forth in claim 1 or 8, said cam track means (58,60) being shaped such that said material feeding device (26,34) is linearly moved by said drive mechanism according to a modified sine curve (40) which is flattened in the region of its opposingly directed peaks (42), since sine curve (40) representing a time-dependent path of movement of said material feeding device (26,34).

10. A crank drive mechanism as set forth in claim 1 or 8, said cam track means (58,60) being shaped such that said material feeding device (26,34) is linearly moved by said drive mechanism according to a modified sine curve (40) which is steeper than a regular sine curve (40) in the central regions of its slopes (44a), said sine curve (40) representing a time-dependent path of movement of said material feeding device (26,34).

11. A crank drive mechanism as set forth in claim 1 or 8, the transmission ratio α of said linear motion transmission unit (76,74) being dependent on eccentricity of said crank pin (14) with respect to said crank rotor axis (0).

12. A crank drive mechanism as set forth in claim 1 or 8, said linear motion transmission unit (76,74) comprising interengaging linear guide face means (76,74) mounted on both said cam follower carrier unit (64) and said main slide element (46), the linear guide face means (76) of said main slide element (46) and the linear guide face means (74) of said cam follower carrier unit (64) defining a mutual slide movement direction, said mutual slide movement direction lying in a plane perpendicular to said crank rotor axis (0), said mutual slide movement direction being oblique with respect to both the direction (Y) defined by said carrier unit guide means (62) and the direction (X) defined by said main slide element guide means (48), said mutual slide movement direction being angularly variable with respect to said direction (X) defined by said main slide element guide means (48) and said direction (Y) defined by said carrier unit guide means (62), said angular variation resulting in a variation of said transmission ratio of said linear motion transmission unit (76,74).

13. A crank drive mechanism as set forth in claim 12, one (76) of said linear guide face means (76,74) being shaped as a guide rib (76), the other one (74) of said linear guide face means (76,74) being shaped as a guide groove (74) accommodating said guide rib (76).

14. A crank drive mechanism as set forth in claim 12, said linear guide face means (76) of said main slide element (46) and said linear guide face means (74) of said cam follower carrier unit (64) being provided on respective rotor members (78 and 70) rotatably mounted with respect to said main slide element (46) and said cam follower carrier unit (64), respectively, about a rotation axis substantially parallel to said crank rotor axis (0).

* * * * *

UNITED STATES PATENT AND TRADEMARK OFFICE
CERTIFICATE OF CORRECTION

PATENT NO. : 5,203,486

DATED : April 20, 1993

INVENTOR(S) : Otto Bihler et al.

It is certified that error appears in the above-indentified patent and that said Letters Patent is hereby corrected as shown below:

Col. 8, line 33, "and radial" should read --or radial--;

Col. 9, line 5, "mean" should read --guide means--;

Col. 9, line 32, "since sine" should read --said sine--.

Signed and Sealed this

Fourth Day of January, 1994

Attest:

BRUCE LEHMAN

Attesting Officer

Commissioner of Patents and Trademarks